US009772675B2

(12) United States Patent
Lin

(10) Patent No.: US 9,772,675 B2
(45) Date of Patent: Sep. 26, 2017

(54) POWER SUPPLY SYSTEM OF ELECTRONIC DEVICE

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 198 days.

(21) Appl. No.: 14/817,414

(22) Filed: Aug. 4, 2015

(65) Prior Publication Data

US 2016/0342194 A1 Nov. 24, 2016

(30) Foreign Application Priority Data

May 19, 2015 (CN) .......................... 2015 1 0255087

(51) Int. Cl.

| | |
|---|---|
| ***G06F 1/00*** | (2006.01) |
| ***G06F 1/32*** | (2006.01) |
| ***G06F 13/40*** | (2006.01) |
| ***G06F 13/364*** | (2006.01) |
| ***G06F 13/42*** | (2006.01) |

(52) U.S. Cl.

CPC .......... *G06F 1/3287* (2013.01); *G06F 1/3243* (2013.01); *G06F 13/364* (2013.01); *G06F 13/4022* (2013.01); *G06F 13/4247* (2013.01)

(58) Field of Classification Search

None

See application file for complete search history.

(56) References Cited

U.S. PATENT DOCUMENTS

| | | | | |
|---|---|---|---|---|
| 9,329,910 | B2 * | 5/2016 | Bohn | G06F 9/5094 |
| 2006/0158806 | A1 * | 7/2006 | Robertson | G06F 1/266 361/62 |
| 2007/0067657 | A1 * | 3/2007 | Ranganathan | G06F 1/3296 713/320 |
| 2008/0155284 | A1 * | 6/2008 | Shimohata | G06F 1/30 713/300 |
| 2011/0219255 | A1 * | 9/2011 | Hsieh | G06F 1/26 713/340 |
| 2013/0060398 | A1 * | 3/2013 | Sip | G06F 13/4095 700/297 |
| 2014/0310548 | A1 * | 10/2014 | Chen | H02J 7/0013 713/321 |

* cited by examiner

*Primary Examiner* — Nitin Patel

(74) *Attorney, Agent, or Firm* — Steven Reiss

(57) ABSTRACT

A power supply system for an electronic device includes a main device and at least one slave device coupled to the main device. The main device includes a power module and a detection module. Each slave device includes a slave control module, a determination module, and a switch module. The power module supplies power for the slave devices via the switch module. The detection module detects a total consumption of power of the coupled slave devices and compares the total of consumed power to a power rating of a power source. Each determination module is configured to determine whether a posterior slave device is coupled to the local slave device. Each slave control module can deactivate the switch module of the local slave device when the total of power consumed exceeds the power rating and the local slave device disconnects from the posterior slave device.

20 Claims, 9 Drawing Sheets

28
21
R3
+3.3V
R4
B
C
E
Q2
R8
22
26
+5V
R7
16
12
+5V
R2
13
R1
Q1
15
R9

POWER SUPPLY SYSTEM OF ELECTRONIC DEVICE

FIELD

The subject matter herein generally relates to a power supply system of an electronic device.

BACKGROUND

Electronic devices, such as computers or monitors, can couple to a plurality of removable slave devices, and can supply power to the slave devices.

BRIEF DESCRIPTION OF THE DRAWINGS

Implementations of the present technology will now be described, by way of example only, with reference to the attached figures.

DETAILED DESCRIPTION

Figure 1:
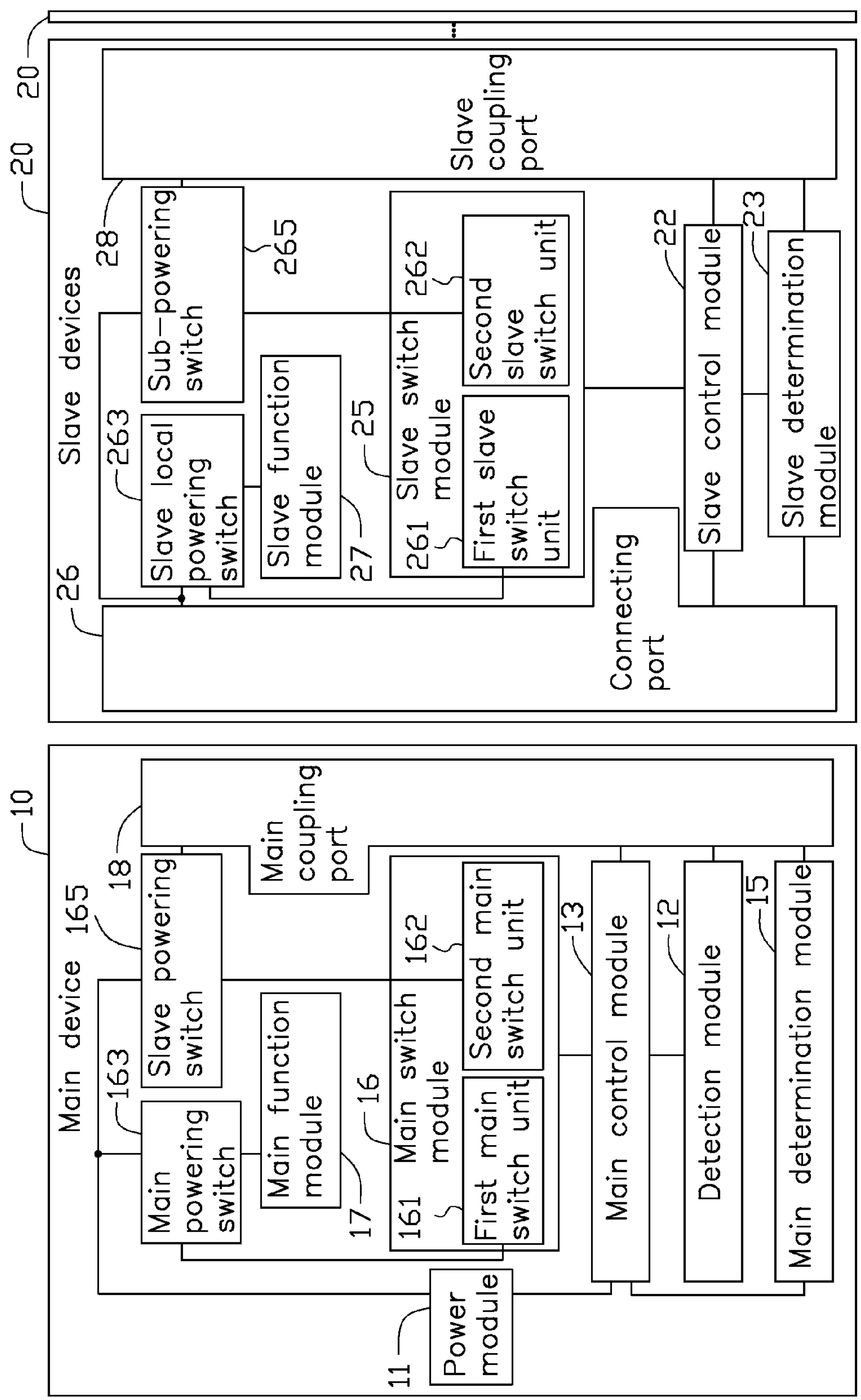
FIG. 1 is a block diagram view of a first embodiment of a power supply system.
Figure 2:
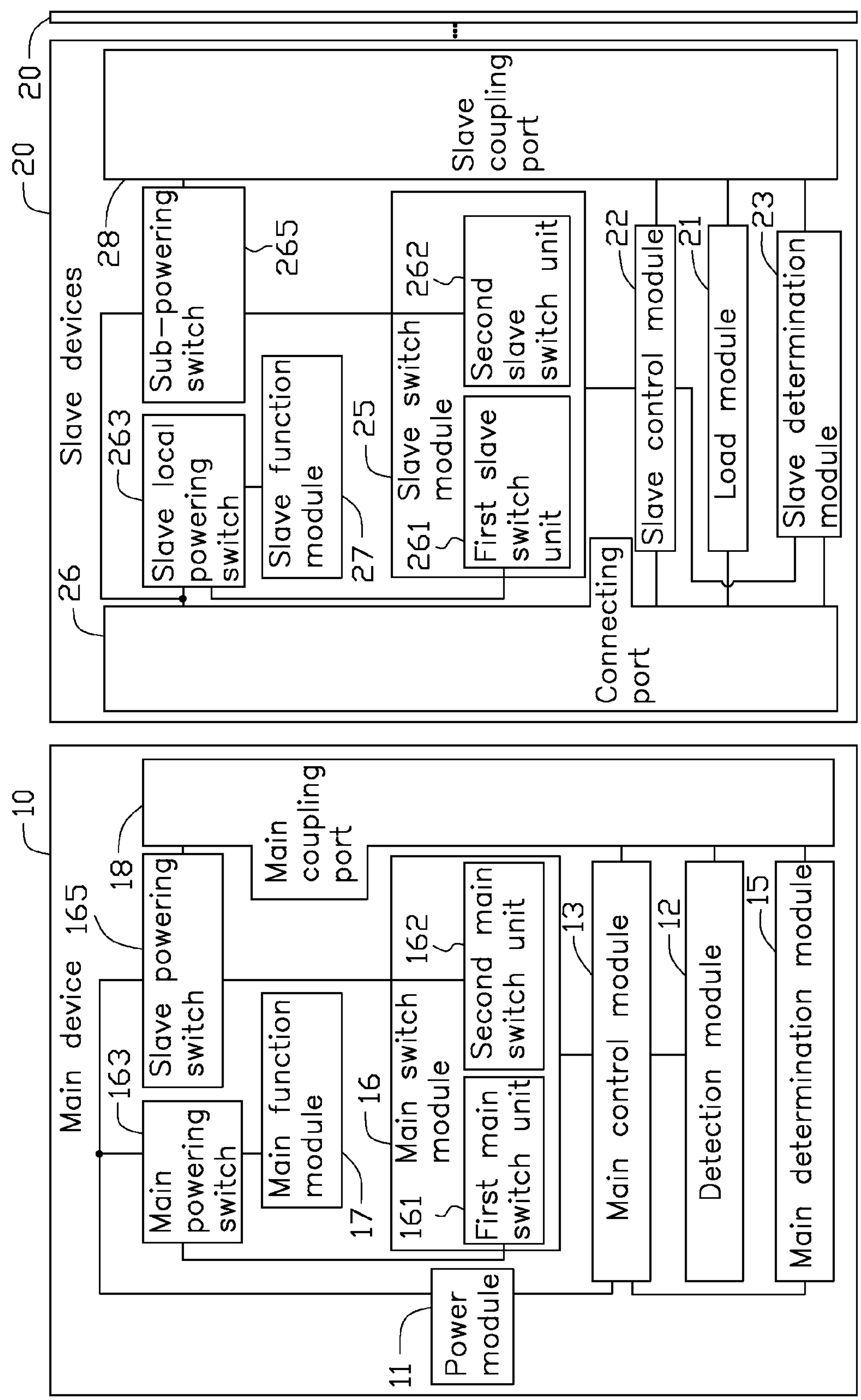
FIG. 2 is a block diagram view of a second embodiment and a third embodiment of a power supply system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the like.

FIG. 1 illustrates a power supply system in accordance with an embodiment, including a main device 10 and a plurality of slave devices 20 (two of the plurality of slave devices 20 are shown). The main device 10 can include a power module 11, a detection module 12, a main control module 13, a main determination module 15, a main switch module 16, and a main function module 17. The main control module 13 can by a micro control unit (MCU). The main function module 17 can be a display module or an audio module controlled by the main control module 13.

The power module 11 is configured to supply power for the slave devices 20 coupled to the main device 10 in a daisy chain arrangement.

The detection module 12 is coupled to the power module 11 and stores a power rating of the power module 11. The detection module 12 is configured to detect whether a total power consumption rate of the coupled slave devices 20 exceeds the rated power and outputs a result of detection.

The main control module 13 is coupled to the detection module 12 and configured to convert the result of detection to a main control signal to each coupled slave device 20.

The main determination module 15 is configured to determine whether the main device 10 is coupled to one slave device 20 and send the determination to the main switch module 16.

The main switch module 16 can include a first main switch unit 161 and a second main switch unit 162. The first main switch unit 161 is coupled to the main function module 17 via a main powering switch 163, and the main switch unit 161 is configured to switch on/switch off the main powering switch 163, so as to connect/disconnect the power module 11 and the main function module 17. The second main switch unit 162 is coupled to a slave powering switch 165 and configured to switch on/switch off the slave powering switch 165 according to the determination, so connecting/disconnecting the power module 11 and the slave device 20. When the determination is that the main device 10 is coupled to any one slave device 20, the second main switch unit 162 is switched on, to switch on the slave powering switch 165. When the determination is that the main device 10 is disconnected from any one slave device 20, the second main switch unit 162 is switched off, to switch off the slave powering switch 165. The main device 10 further includes a main coupling port 18 coupled to the power module 11, the detection module 12, the main control module 13, and the main determination module 15.

Each slave device 20 can include a slave control module 22, a slave determination module 23, a slave switch module 25, a connecting port 26, a slave coupling port 28, a slave function module 27, a slave local powering switch 263, and a sub-powering switch 265. The slave control module 22 can be a micro control unit (MCU). The slave function module 27 can be a display module or an audio module controlled by the slave control module 22.

The connecting port 26 can be coupled to the main coupling port 18 or the slave coupling port 28 of a prior slave device 20. When the connecting port 26 is coupled to the main coupling port 18 or to the slave coupling port 28 of a prior slave device 20, the slave powering switch 165 is coupled to the slave local powering switch 263 and the sub-powering switch 265.

The slave control module 22 is configured to receive the main control signal and stores a rate of power consumption of the slave device 20 and is capable of sending the consuming rate to the detection module 12 via an I2C bus. The slave determination module 23 is configured to determine whether the slave device 20 is coupled to a posterior slave device 20 and send a sub-control signal to the corresponding slave control module 22 according to the determination. The slave control module 22 is configured to receive the main control signal from the main device 10 and the sub-control signal from the corresponding slave determination module 23.

The slave switch module 25 is coupled to the slave control module 22 and includes a first slave switch unit 261 and a second slave switch unit 262. The first slave switch unit 261 is coupled to the slave function module 27 via the slave local powering switch 263, and the first slave switch unit 261 is configured to switch on/switch off the slave local powering switch 263, so connecting/disconnecting the power module 11 and the slave function module 27. The second slave switch unit 262 is coupled to a sub-powering switch 265 and configured to switch on/off the sub-powering switch 265 according to the sub-control signal and the main control signal, so connecting/disconnecting the power module 11 and posterior slave device 20 via the local slave device 20.

When the total power consumption rate of the coupled slave devices 20 exceeds the rated power of the power module 11 and the slave determination module 23 determines that the local slave device 20 is not coupled to a posterior slave device 20, the slave control module 22 switches off the first slave switch unit 261. The power module 11 and the slave function module 27 are thus disconnected, and the second slave switch unit 262 is also switched off, disconnecting a power supply from the local slave device 20 to the posterior slave device 20. When the total power consumption rate of the coupled slave devices 20 exceeds the rated power of the power module 11, but the slave determination module 23 determines that the local slave device 20 is coupled to a posterior slave device 20, the slave control module 22 does not switch off the slave switch module 25. When the total power consumption rate of the coupled slave devices 20 is less than the rated power of the power module 11, the slave control module 22 does not switch off the slave switch module 25.

Thus, when the total power consumption rate of the coupled slave devices 20 exceeds the rated power of the power module 11, a last slave device 20 is disconnected from the power module 11 and the supply of power from the last slave device 20 to a next slave device 20 is disconnected.

In a first embodiment, the slave control module 22 sends the power consumption rate of a slave device 20 to the detection module 12 via the I2C bus. Each time a new slave device 20 is coupled to a power supply, the detection module 12 compares a total power consumption rate of all the coupled slave devices 20 with the rated power of the power module 11 and then sends out the main control signal to all the coupled slave devices 20.

Referring to FIGS. 2-6, in a second embodiment, each slave device 20 can include a load module 21. The load module 21 can include a load resistor R3 and a load transistor Q2. When the slave devices 20 are coupled in a daisy chain arrangement, the load resistors R3 are coupled together in series. The principle is explained below.

Figure 3:
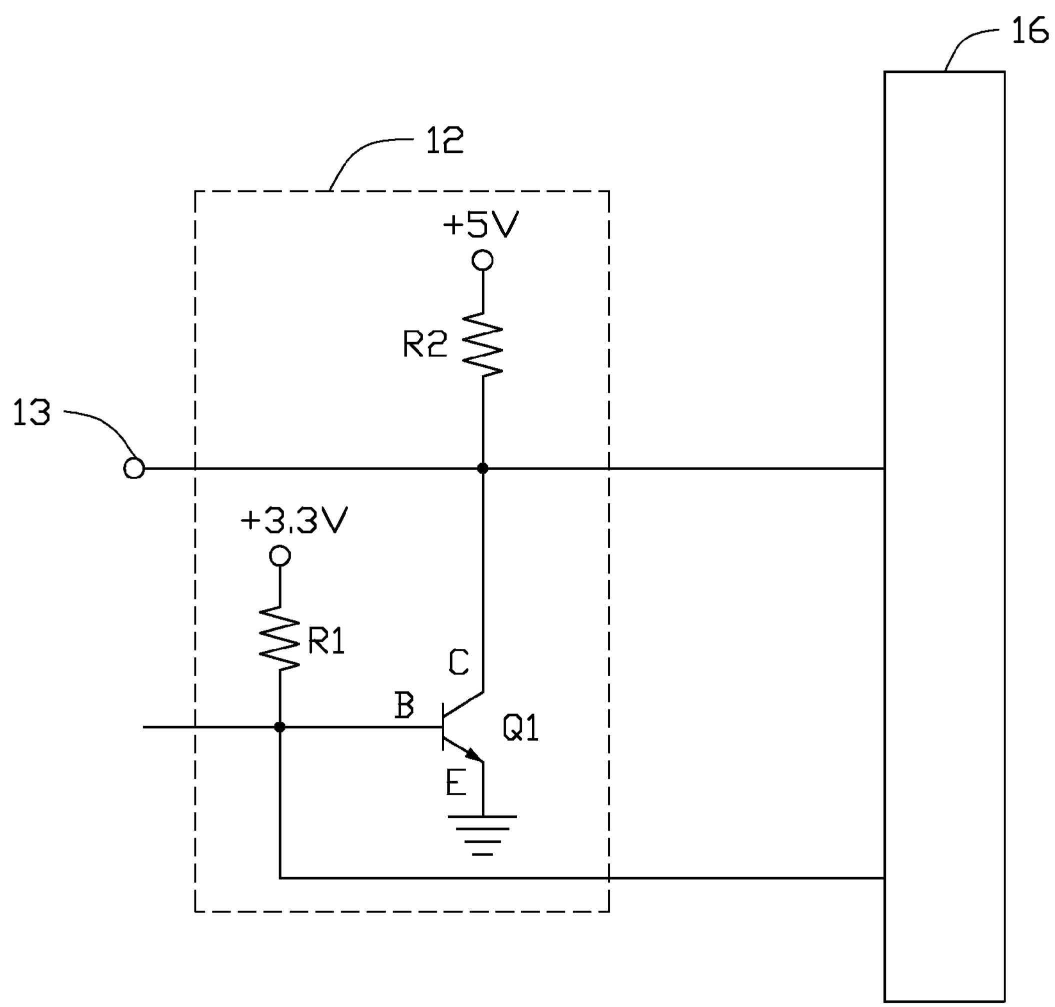
FIG. 3 is a circuit diagram of a main coupling interface and a detection module of a main device of the power supply system in the second embodiment of FIG. 2.

Referring to FIG. 3, a first pin of the main coupling port 18 is coupled to the detection module 12. The detection module 12 includes a detection transistor Q1. In at least one embodiment, the detection transistor Q1 is a triode, the base B of the detection transistor Q1 is coupled to a high level voltage, such as +3.3V via a first resistor R1. Base B of the detection transistor Q1 is further coupled to a second pin of the main coupling port 18, and the collector C of the detection transistor Q1 is coupled to another high level voltage, such as +5V via a pull-up resistor R2. A partial voltage of the collector C of the detection transistor Q1 is taken as a detection voltage for determining whether the total power consumption rate of all the coupled slave devices 20 exceeds the rated power of the power module 11.

Figure 4:
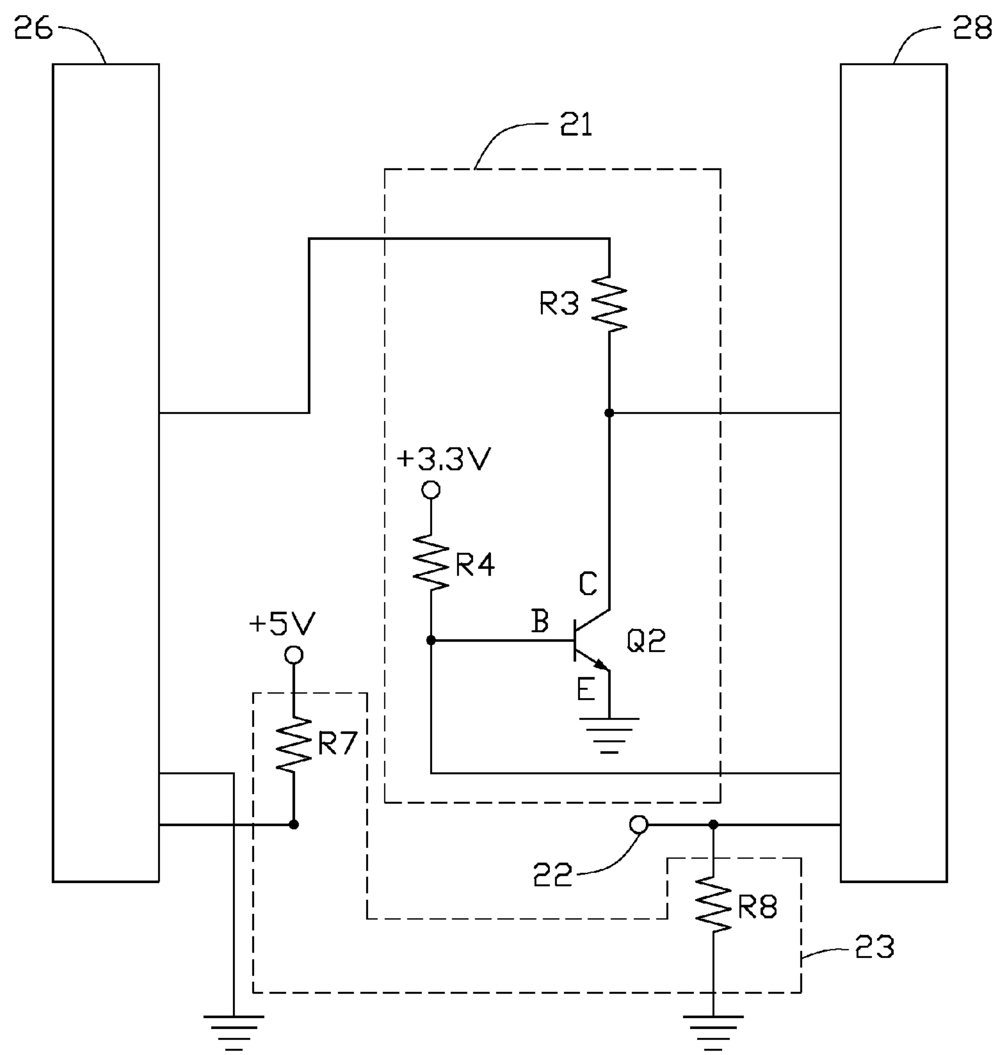
FIG. 4 is a circuit diagram of a connecting interface, slave coupling interface, a slave load module, and a slave determination module of a slave device of the power supply system in the second embodiment of FIG. 2.

Referring to FIG. 4, a pin of each connecting port 26, which can be coupled to the second pin of the main coupling port 18, is grounded. A pin of each slave coupling port 28, which can be coupled to the first pin of the main coupling port 18, is coupled to the load module 21. In at least one embodiment, the load transistor Q2 is a triode, and a base B of the load transistor Q2 is coupled to a high level voltage, +3.3 V via a second resistor R4. Base B of the load transistor Q2 can be further coupled to the connecting port 26 of the posterior slave device 20. The collector C of the load transistor Q2 is coupled to a first end of the load resistor R3. A second end of the load resistor R3 is coupled to the collector C of the detection transistor Q1 or to the collector C of the load transistor Q2 of the prior slave device 20.

Taking two slave devices 20 for example, a first slave device 20 is coupled to the main device 10, and a second slave device 20 is coupled to the first slave device 20. The base B of the detection transistor Q1 is grounded, the detection transistor Q1 is switched off, and the load resistor R3 of the first slave device 20 is coupled to the pull-up resistor R2 in series. The base B of the load transistor Q2 of the first slave device 20 is grounded, the load transistor Q2 of the first slave device is switched off, and the load resistor R3 of the second slave device 20 is coupled to the load resistor R3 of the first slave device 20 in series. The base B of the load transistor Q2 of the second slave device 20 is coupled to the high level voltage, the load transistor Q2 of the first slave device is switched on, and the first end of the load resistor R3 of the second slave device 20 is grounded. Thus, the more slave devices which are coupled, the greater is the total power consumed, and the higher is the voltage detected at the collector C of the detection transistor Q1. A preset voltage can be determined according to the rated power of the power module 11. When the detected voltage is greater than the preset voltage, the main control module 13 sends a low level main control signal to each slave control module 22. When the detected voltage is less than or equal to the preset voltage, the main control module 13 sends a high level main control signal to each slave control module 22.

Figure 7:
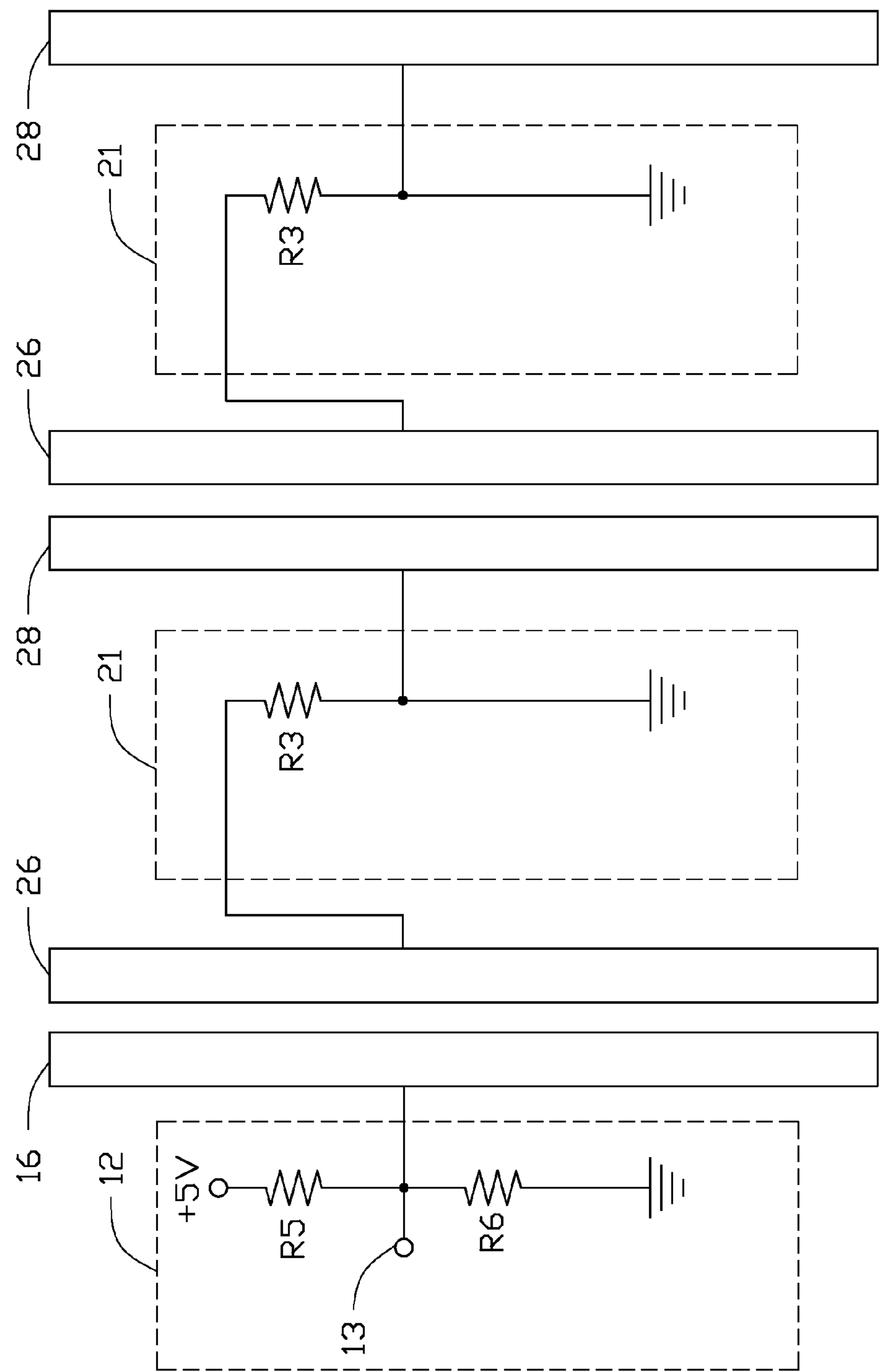
FIG. 7 is a circuit diagram of the detection module of the main device and the load modules of two slave devices of the power supply system of FIG. 2 in the third embodiment, without coupling together.
Figure 8:
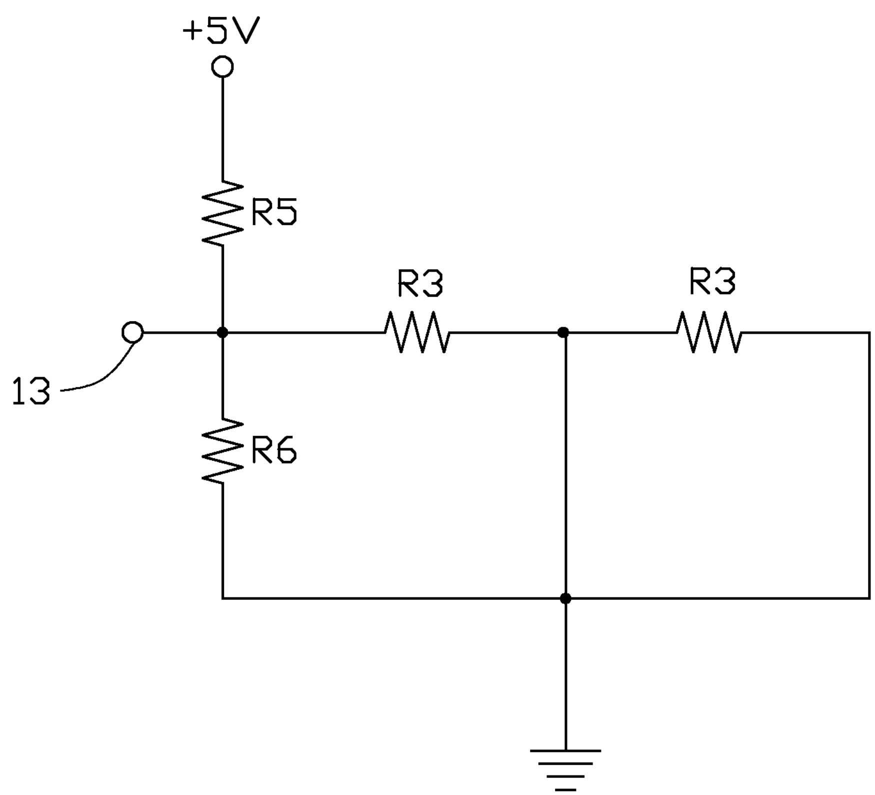
FIG. 8 is a circuit diagram of the detection module and the load modules of two slave devices of the power supply system of FIG. 7 in the third embodiment.

Referring to FIGS. 7 and 8, in a third embodiment, when the slave devices 20 are coupled in a daisy chain arrangement, the load resistors R3 are coupled together in parallel. The principle is explained below.

The first pin of the main coupling port 18 is coupled to the detection module 12. The detection module 12 includes a first detection resistor R5 and a second detection resistor R6 coupled to the first detection resistor R5 in series. A first end of the second detection resistor R6 is grounded. The load module 21 only includes the load resistor R3, which is grounded. The pin of each slave coupling port 28, which corresponds to the first pin of the main coupling port 18, is coupled to the load resistor R3. Thus, when the slave devices 20 are coupled in a daisy chain arrangement, each load resistor R3 is coupled to the second detection resistor R6 in parallel. A voltage between opposite ends of the second detection resistor R6 is taken as a detection voltage for determining whether the total power consumption of all the coupled slave devices 20 exceeds the rated power of the power module 11. The voltage is also outputted from the first pin of the main coupling port 18.

Thus, the more slave devices 20 which are coupled, the greater is the total power which is consumed, and the lower is the voltage of the first pin which is detected. A preset voltage can be determined according to the rated power of the power module 11. When the detected voltage is less than the preset voltage, the main control module 13 sends a low level main control signal to each slave control module 22. When the detected voltage is greater than or equal to the preset voltage, the main control module 13 sends a high level main control signal to each slave control module 22.

When each slave control module 22 receives the low level main control signal and a sub-control signal, indicating that no posterior slave device 20 is coupled, the slave control module 22 cuts off local first slave switch unit 261 and second slave switch unit 262. This disconnects the power module 11 and local slave function module 27, and further disconnects the power module 11 and posterior slave device 20 via the local slave device 20.

Figure 5:
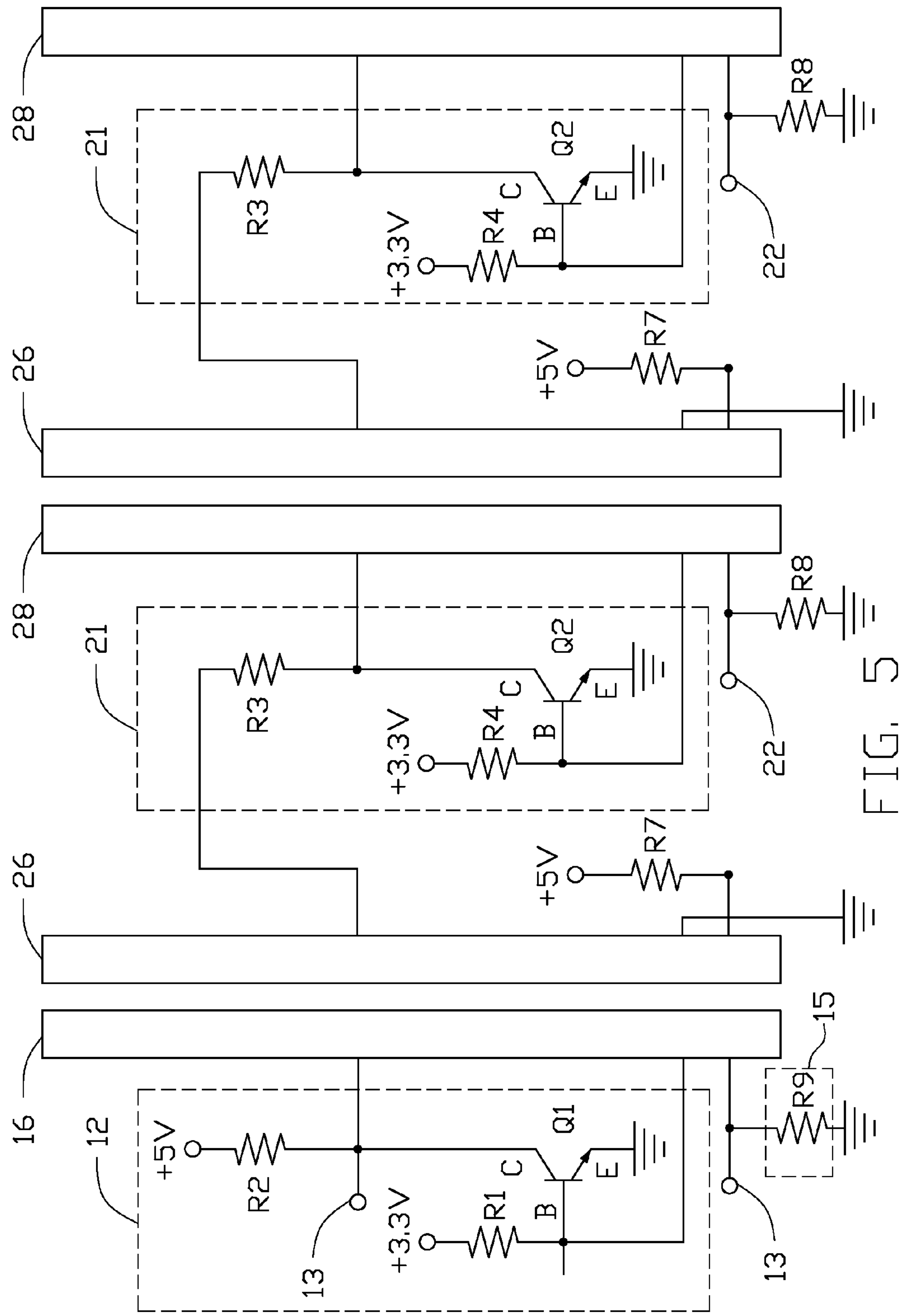
FIG. 5 is a circuit diagram of the main coupling interface, the connecting interfaces and slave coupling interfaces of two slave devices of the power supply system in the second embodiment of FIG. 2.
Figure 6:
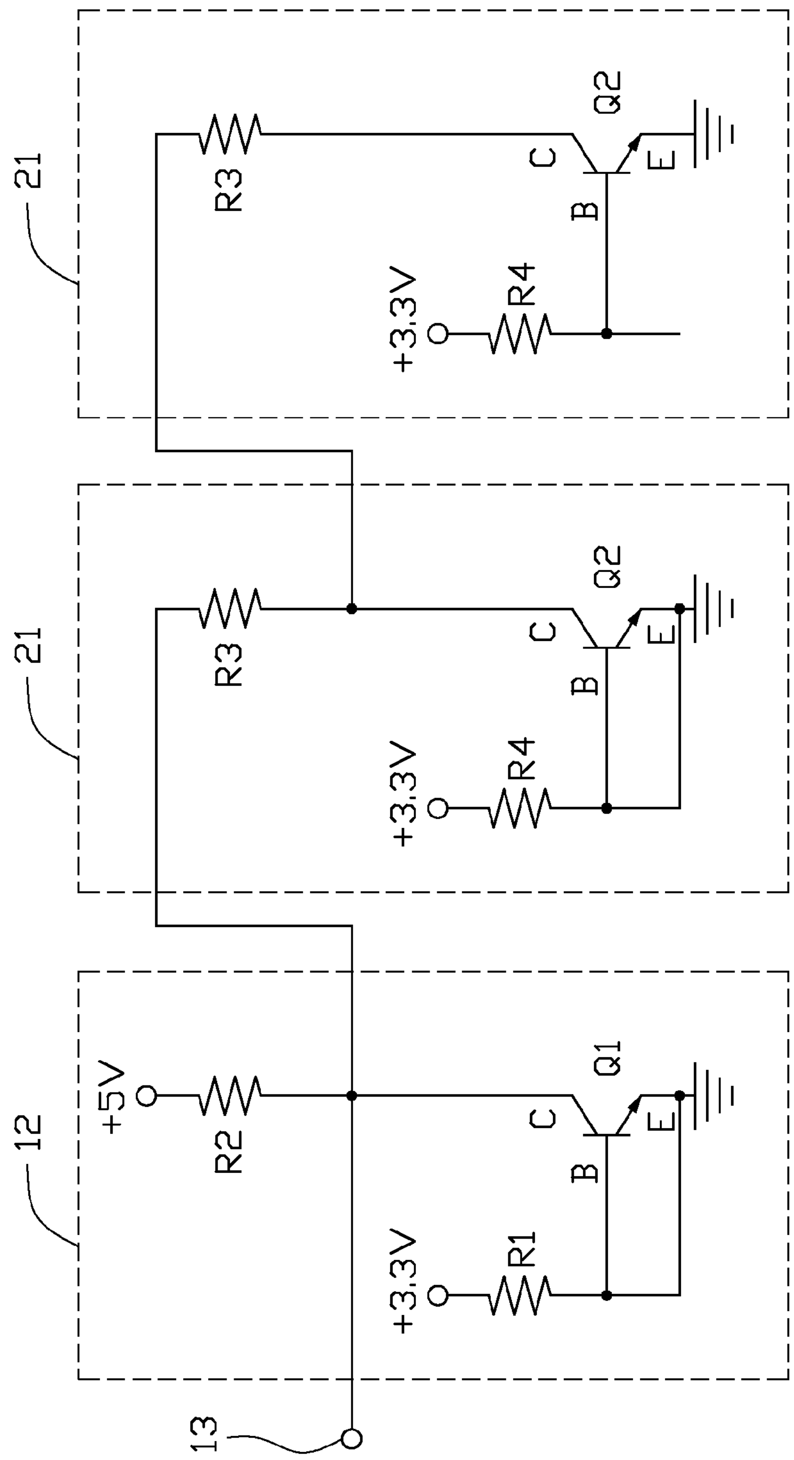
FIG. 6 is a circuit diagram of the detection module and the load modules of two slave devices of the power supply system of FIG. 5.
Figure 9:
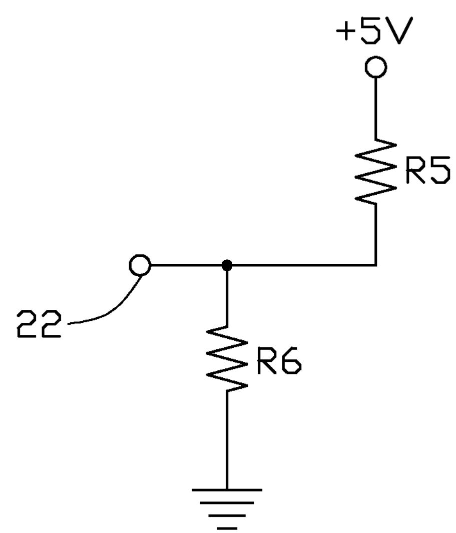
FIG. 9 is a circuit diagram of two slave determinations of two slave devices of the power supply systems of FIG. 1 and FIG. 2.

Referring to FIG. 5 and FIG. 9, each slave determination module 23 can include a pull-up resistor R7 coupled to the local connecting port 26 and a pull-down resistor R8 coupled to the local slave coupling port 28. A first end of the pull-down resistor R8 is coupled to the slave control module 22 and configured to send the sub-control signal to the slave control module 22. A second end of the pull-down resistor R8 is grounded. The pull-up resistor R7 is coupled to the first end of the pull-down resistor R8 of the prior slave device 20.

When the local slave device 20 is coupled to a posterior slave device 20, a voltage of the first end of the pull-down resistor R8 is pulled high, so that the local slave control module 22 receives a high level voltage sub-control signal. When the local slave device 20 is not coupled to a posterior slave device 20, a voltage of the first end of the pull-down resistor R8 is at a low level, so that the local slave control module 22 receives a low level voltage sub-control signal.

When the slave control module 22 receives a low level main control signal and a low level sub-control signal, the slave control module 22 cuts off the local slave switch module 25.

The main determination module 15 can include a pull-down resistor R9 coupled to the a main coupling port 18. A first end of the pull-down resistor R9 is coupled to the high level voltage and the main control module 13 and configured to send the result of determination to the main switch module 16 via the main control module 13. The pull-down resistor R9 can be coupled to the first end of the pull-up resistor R7 of the posterior slave device 20.

When the main device 10 is coupled to a posterior slave device 20, a voltage of the first end of the pull-down resistor R9 is pulled high, so that the main switch module 16 receives a high level voltage signal, switching on the second main switch unit 162 and enabling the power module 11 to supply power to the posterior slave device 20. When the main device 10 is not coupled to a posterior slave device 20, a voltage of the first end of the pull-down resistor R9 is at a low level, so that the main switch module 16 receives a low level voltage sub-control signal, so switching off the second main switch unit 162 to cut off the power module 11 and preventing electric shock due to misoperation.

In other embodiments, the functions of the main determination module 15 and the slave determination module 23 can be performed by software modules.

The embodiments shown and described above are only examples. Many details are often found in the art such as the other features of a power supply system of electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power supply system comprising:
a main device comprising a power module, a main control module, and a detection module; and
at least two slave devices couplable to the main device in a daisy chain arrangement, each slave device comprising a slave control module, a slave determination module, and a slave switch module;
wherein the power module supplies power for each slave device and a posterior slave device via the slave switch module;
wherein the detection module detects a total power consumption rate of all coupled slave devices and compare the total power consumption rate with a rated power of the power module;
wherein the main control module sends a main control signal to the slave control module of each coupled slave device according to a comparison result from the detection module;
wherein each slave determination module determines whether a local slave device is coupled to the posterior slave device and sends a sub-control signal to the local slave device according to a determination result; and
wherein each slave control module deactivates the slave switch module in event that the total power consumption rate is greater than the rated power and the local slave device is not coupled to the posterior slave device.

2. The power supply system of claim 1, wherein when the total power consumption rate is greater than the rated power and the local slave device is coupled to the posterior slave device, or when the total power consumption rate is less than or equal to the rated power, the slave switch module is switched on.

3. The power supply system of claim 1, wherein the main device comprises a main coupling port, each slave device comprises a connecting port and a slave coupling port, the connecting port is couplable to the main coupling port or the slave coupling port of a prior slave device, and the slave coupling port is couplable to the connecting port of the posterior slave device.

4. The power supply system of claim 3, wherein slave determination module comprises a slave pull-up resistor coupled to a local connecting port and a slave pull-down resistor coupled to a local slave coupling port, a first end of the slave pull-down resistor is coupled to the slave control module, and sends the sub-control signal to the slave control module, a second end of the slave pull-down resistor is grounded, the slave pull-up resistor is coupled to the first end of the slave pull-down resistor of the prior slave device.

5. The power supply system of claim 3, wherein the detection module comprises a pull-up resistor, each slave device comprises a load module, which comprises a load resistor, when the slave devices are coupled in a daisy chain arrangement, the power module supplies power for the load resistors in the daisy chain arrangement, a first end of the pull-up resistor is coupled to a power voltage, a second end of the pull-up resistor is coupled load resistors in series, the detection module detects the total power consumption rate through the voltage of the second end of the pull-up resistor.

6. The power supply system of claim 5, wherein a first pin of the main coupling port is coupled to the detection module, the detection module comprises a detection transistor, the base of the detection transistor is coupled to a high level voltage via a first resistor, the base of the detection transistor is further coupled to a second pin of the main coupling port, and a pin of each connecting port, which is couplable to the second pin of the main coupling port, is grounded; and the collector of the detection transistor is coupled to the second end of the pull-up resistor.

7. The power supply system of claim 6, wherein a pin, which is couplable to the first pin of the main coupling port, of each slave coupling port is coupled to the load module, each load module further comprises a load transistor, a base of the load transistor is coupled to the high level voltage via a second resistor, the base of the load transistor is further couplable to the connecting port of the posterior slave device, the collector of the load transistor is coupled to a first end of the load resistor, and a second end of the load resistor is coupled to the collector of the detection transistor or the collector of the load transistor of a prior slave device.

8. The power supply system of claim 7, wherein the at least one slave device comprises a first slave device coupled to the main device and a second slave device coupled to the first slave device, the base of the detection transistor is grounded, the detection transistor is switched off, and the load resistor of the first slave device is coupled to the pull-up resistor in series; the base of the load transistor of the first slave device is grounded, the load transistor of the first slave device is switched off, and the load resistor of the second slave device is coupled to the load resistor of the first slave device in series.

9. The power supply system of claim 1, wherein the detection module stores the rated power, each slave control module stores a local consumed power, when each slave device is coupled to the posterior slave device, the corresponded slave control module sends the local consumed power to the detection module via a control bus, and the detection module compares the received total power consumption rate to the rated power.

10. The power supply system of claim 1, wherein the detection module comprises a first detection resistor and a second detection resistor, a first end of the second detection resistor is grounded, and a second end of the second detection resistor is coupled to the first detection resistor in series, the first detection resistor is coupled to a power voltage, each slave device comprises a load module, which comprises a load resistor, when the slave devices are coupled in a daisy chain arrangement, the power module supplies power for the load resistors in the daisy chain arrangement, each load resistor is coupled to the second detection resistor in parallel, the detection module detects the total power consumption rate through the voltage of the second end of the second detection resistor.

11. The power supply system of claim 1, wherein the main device further comprises a main determination module, a main switch module, and a slave powering switch, the main determination module determines whether the main device couples to a slave device and send a determination result to the main control module; the main switch module comprises a main switch unit coupled to the slave powering switch; the slave powering switch is coupled to the power module; and when the main device does not couple to the slave device, the main control module switches off the slave powering switch via the main switch unit, and when the main device couples to the slave device, the slave powering switch is switched on.

12. The power supply system of claim 1, wherein each slave device further comprises a slave function module, a slave local powering switch and a sub-powering switch, the slave switch module comprises a first slave switch unit and a second slave switch unit, the first slave switch unit is coupled to the slave function module via the slave local powering switch, and the first slave switch unit switches on/off the slave local powering switch, connecting or disconnecting the power module and the slave function module; the second slave switch unit is coupled to the sub-powering switch, and switches on/off the sub-powering switch according to the sub-control signal and the main control signal, connecting or disconnecting the power module and posterior slave device via the local slave device.

13. A power supply system comprising:

a main device comprising a power module, a main control module, and a detection module; and at least one slave device couplable to the main device in a daisy chain arrangement, each slave device comprising a slave control module, a slave determination module, and a slave switch module;

wherein the power module supplies power for each slave device and a posterior slave device via the slave switch module;

wherein the detection module detects a total power consumption rate of all coupled slave devices and compare the total power consumption rate with a rated power of the power module;

wherein the main control module sends a main control signal to the slave control module of each coupled slave device according to a compare result from the detection module;

wherein each slave determination module determines whether a local slave device is coupled to the posterior slave device and sends a sub-control signal to the local slave device according to a determination result;

wherein each slave control module deactivates the slave switch module in event that the total power consumption rate is greater than the rated power and the local slave device is not coupled to the posterior slave device;

wherein when the total power consumption rate is greater than the rated power and the local slave device is coupled to the posterior slave device, the slave switch module is switched on; and wherein when the total power consumption rate is less than or equal to the rated power, the slave switch module is switched on.

14. The power supply system of claim 13, wherein the main device comprises a main coupling port, each slave device comprises a connecting port and a slave coupling port, the connecting port is couplable to the main coupling port or the slave coupling port of the prior slave device, and the slave coupling port is couplable to the connecting port of the prior slave device.

15. The power supply system of claim 13, wherein slave determination module comprises a slave pull-up resistor coupled to a local connecting port and a slave pull-down resistor coupled to a local slave coupling port, a first end of the slave pull-down resistor is coupled to the slave control module, and sends the sub-control signal to the slave control module, a second end of the slave pull-down resistor is grounded, the slave pull-up resistor is coupled to the first end of the slave pull-down resistor of the prior slave device.

16. The power supply system of claim 13, wherein the detection module stores the rated power, each slave control module stores a local consumed power, when each slave device is coupled to the posterior slave device, the corresponded slave control module sends the local consumed power to the detection module via a control bus, and the detection module compares the received total power consumption rate to the rated power.

17. The power supply system of claim 13, wherein the detection module comprises a pull-up resistor, each slave device comprises a load module, which comprises a load resistor, when the slave devices are coupled in a daisy chain arrangement, the power module supplies power for the load resistors in the daisy chain arrangement, a first end of the pull-up resistor is coupled to a power voltage, a second end of the pull-up resistor is coupled load resistors in series, the detection module detects the total power consumption rate through the voltage of the second end of the pull-up resistor.

18. The power supply system of claim 17, wherein a first pin of the main coupling port is coupled to the detection module, the detection module comprises a detection transistor, the base of the detection transistor is coupled to a high level voltage via a first resistor, the base of the detection transistor is further coupled to a second pin of the main coupling port, and a pin of each connecting port, which is couplable to the second pin of the main coupling port, is grounded; and the collector of the detection transistor is coupled to the second end of the pull-up resistor.

19. The power supply system of claim 18, wherein a pin, which is couplable to the first pin of the main coupling port, of each slave coupling port is coupled to the load module, each load module further comprises a load transistor, a base of the load transistor is coupled to the high level voltage via a second resistor, the base of the load transistor is further couplable to the connecting port of the posterior slave device, the collector of the load transistor is coupled to a first end of the load resistor, and a second end of the load resistor is coupled to the collector of the detection transistor or the collector of the load transistor of a prior slave device.

20. The power supply system of claim 19, wherein the at least one slave device comprises a first slave device coupled to the main device and a second slave device coupled to the first slave device, the base of the detection transistor is grounded, the detection transistor is switched off, and the load resistor of the first slave device is coupled to the pull-up resistor in series; the base of the load transistor of the first slave device is grounded, the load transistor of the first slave device is switched off, and the load resistor of the second slave device is coupled to the load resistor of the first slave device in series.

* * * * *